United States Patent [19]
Ackerman

[11] 3,913,410
[45] Oct. 21, 1975

[54] VARIABLE SPEED GEARING

[76] Inventor: Leonard Stanley Ackerman, 355 Lakeview Ave., Rockville Center, N.Y. 11570

[22] Filed: Sept. 11, 1974

[21] Appl. No.: 505,050

Related U.S. Application Data

[63] Continuation-in-part of Ser. No. 416,621, abandoned.

[52] U.S. Cl. .............. 74/217 C; 74/230.18; 74/244
[51] Int. Cl.². F16H 9/00; F16H 55/52; F16H 55/30
[58] Field of Search ........ 74/217 C, 230.18, 230.19, 74/230.20, 230.21, 230.22, 230.23, 244

[56] References Cited
UNITED STATES PATENTS
1,650,449  11/1927  Jaeger ................................. 74/244
3,800,613  4/1974  Clark .................................. 74/244

*Primary Examiner*—Leonard H. Gerin
*Attorney, Agent, or Firm*—Frederick W. Turnbull

[57]  ABSTRACT

A variable speed sprocket and chain drive in which two parallel chains are driven by (or drive) a variable diameter sprocket comprising pairs of sprockets operatively connected together by a differential means so that the pairs of gears may be freely moved outwardly and inwardly of the variable diameter sprocket.

6 Claims, 14 Drawing Figures

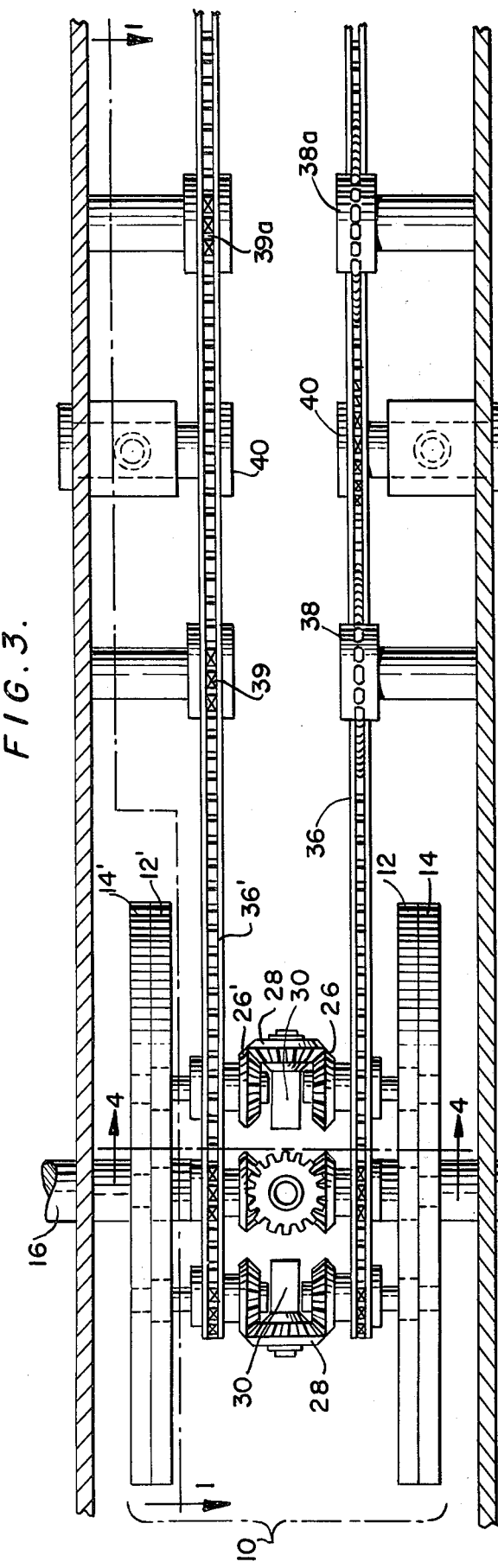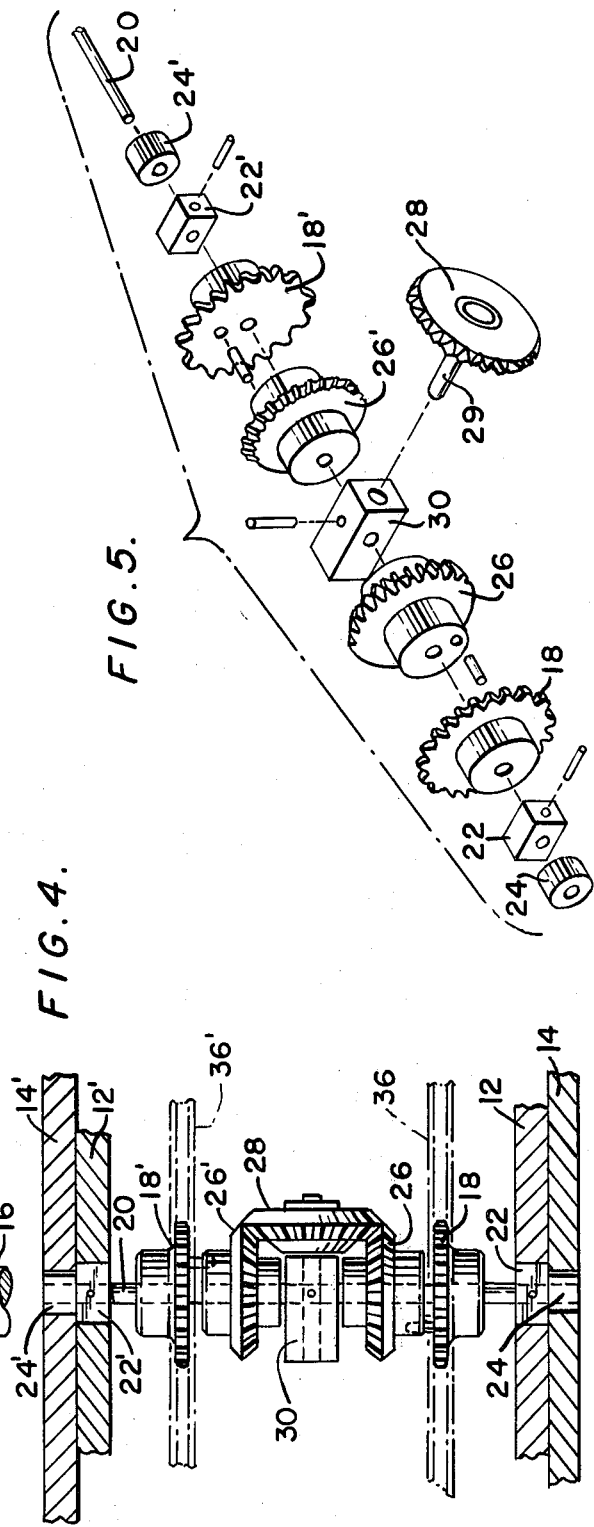

VARIABLE SPEED GEARING

This is a continuation-in-part of application Ser. No. 416,621 filed Nov. 16, 1973, now abandoned.

It was suggested in U.S. Pat. No. 724,450 that a continuously variable speed chain drive could be made by providing two variable diameter sprockets each including a plurality of circumferentially spaced small sprockets. Each small sprocket being provided with an overrunning clutch device. The device of U.S. Pat. No. 724,450 cannot be adjusted except during operation; and cannot drive in the reverse direction.

It is an object of the present invention to provide a variable speed sprocket and chain drive that can drive in either direction and which can be adjusted when the device is not in operation.

Other and further objects and advantages will appear from the following specification taken with the accompanying drawing in which like characters of reference refer to similar parts in the several views and in which:

FIG. 3 is a view of the device shown in FIGS. 1 and 2; in the direction 3—3 in FIG. 2.

FIG. 4 is a fragmentory sectional view on line 4—4 of FIG. 3 illustrating the mounting of one pair of small sprockets of the variable diameter sprocket.

FIG. 5 is an exploded view of the mounting of a pair of small sprockets.

For convenience it will be assumed that the variable diameter sprocket is the driving sprocket, and the constant diameter sprocket is the driven sprocket as is conventional in bicycles.

Figure 1:
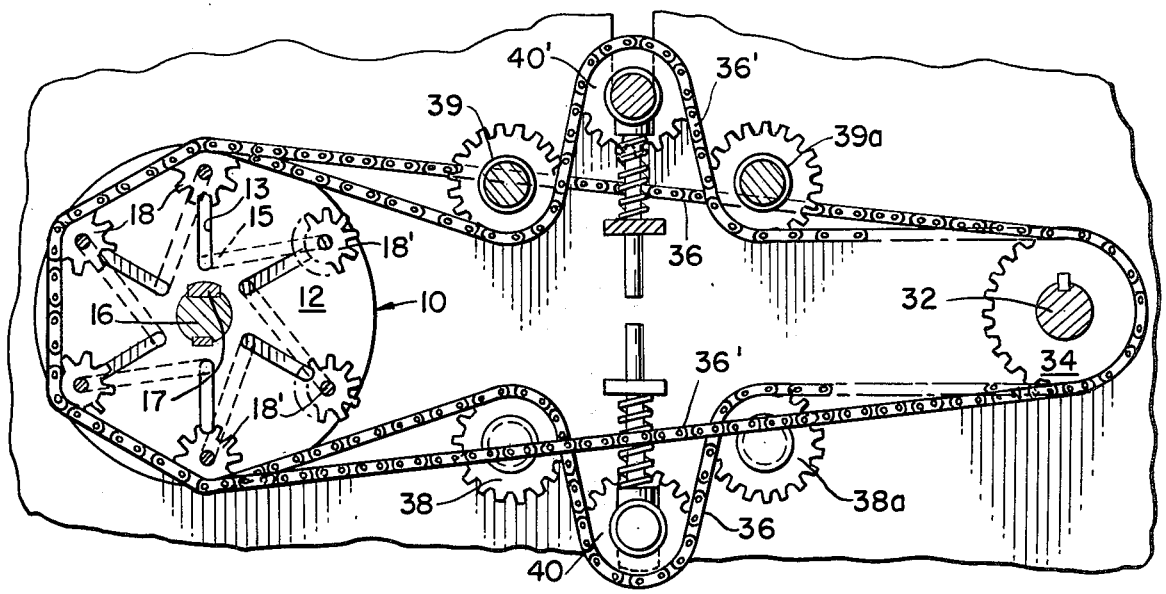
FIG. 1 is an elevation of the device, partly in section along line 1—1 of FIG. 3 having horizontal shafts operating at the highest speed ratio.
Figure 2:
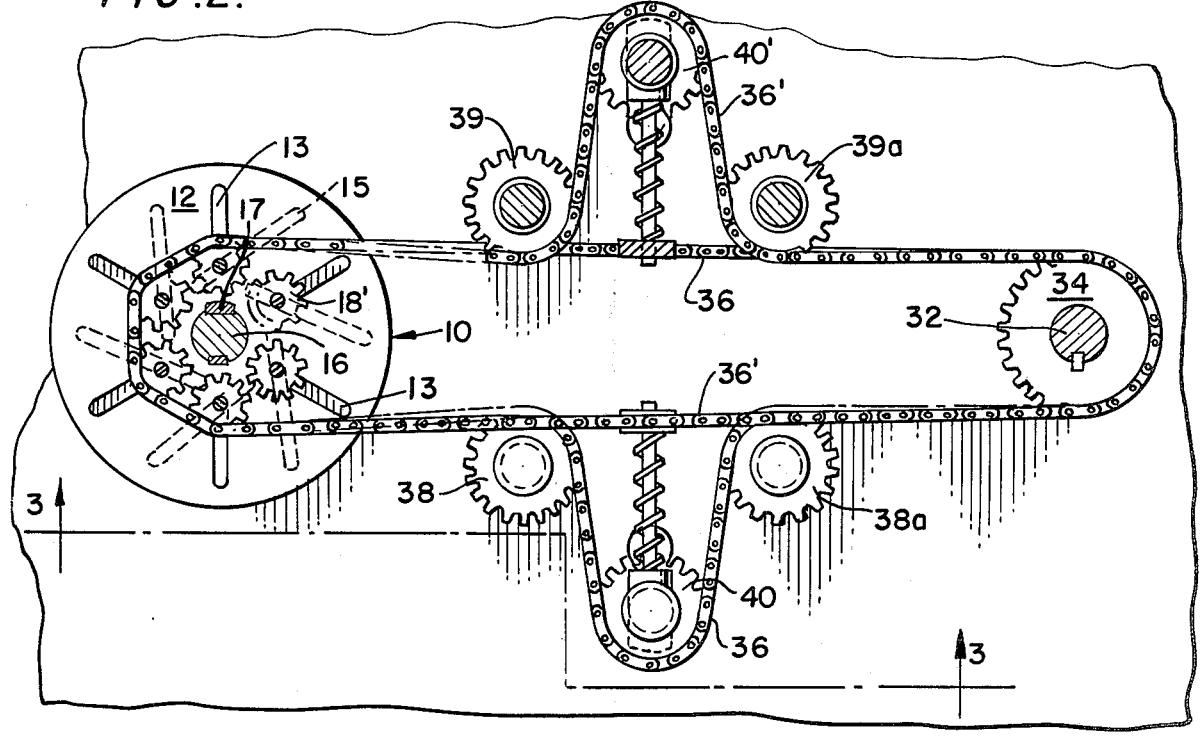
FIG. 2 is a view similar to that of FIG. 1 operating at the lowest speed ratio.

Referring to FIGS. 1, 2 and 3 it is noted that the sprocket wheel 10 preferably comprises two discs 12, 12' having radial slots 13, 13' and two discs 14, 14' having oblique slots 15, 15'. Discs 12, 12' are keyed to shaft 16. Some means or other, such as shown in U.S. Pat. No. 724,450, for instance, indicated in FIGS. 1 and 2 at 17 is provided to rotate discs 14, 14' with respect to discs 12, 12' to adjust the radial positions of a plurality of pairs of small sprockets 18, 18'. Six such pairs are shown in FIGS. 1 and 2 but other numbers of pairs could be provided.

Referring to FIGS. 4 and 5 it is seen that sprockets 18, 18' are mounted for free rotation on carrier shaft 20. Carrier shaft 20 is not rotatable as it is pinned (FIG. 5) to rectangular blocks 22, 22' which are guided radially in the generally radial slots 13 in discs 12, 12' under the influence of rotatable discs 14, 14'. Rollers 24, 24' engage in the oblique slots 15 in discs 14, 14'.

Keyed to (or integral with) sprockets 18, 18' are bevel gears 26, 26'. Bevel gears 26, 26' each mesh with a bevel gear 28 that is rotatable on a stub shaft 29 which is mounted in a block 30 which is fixed or keyed to carrier shaft 20.

It will be understood, then, that if either of sprockets 18 or 18' rotate in one direction on carrier shaft 20 the other sprocket 18' or 18 will rotate in the other direction an equal amount.

From FIGS. 1, 2 and 3 it is seen that the driven shaft 32 has two sprockets 34, 34' of the same diameter keyed to it, spaced so that one chain 36' is trained about small sprockets 18' and 34'; and the second chain 36 is trained about sprockets 18 and sprocket 34 which cannot be seen in FIGS. 1 and 2 because it is directly behind sprocket 34' in those Figures.

Comparing the run of chains 36 and 36' in FIGS. 1 and 2 it is seen that each chain is provided in one of its flights between the fixed diameter and the variable diameter sprockets with a take-up device such as a slack-removing loop. Chain 36 is trained over idler sprockets 38, 38a and between these two idlers take-up sprocket 40 is movable so that when the small sprockets 18 move inwardly from their positions in FIG. 1 to their positions in FIG. 2, the take-up sprocket 40 moving down (in FIG. 2) prevents slack in chain 36.

Similarly chain 36' trained over idler sprockets 39 and 39a has a movable take-up sprocket 40' which from FIG. 1 to FIG. 2 is moved upwardly to take up slack. Upon moving small sprockets 18, 18' outwardly from their FIG. 2 to their FIG. 1 positions take-up sprockets 40 and 40' will move inwardly to provide the additional chain required by the greater circumference of sprocket 10. Sprockets 40 and 40' may be spring pressed or may be biased for outward and inward movement by any other means.

It will be understood that two variable diameter sprockets such as sprocket 10 may be mounted on parallel shafts, the one to drive the other to give a very wide range of speeds, since the slack developed by one such variable diameter sprocket as its diameter is reduced will be used by the other variable diameter sprocket.

In this device it is clear that as the variable diameter sprocket increases in diameter it requires a greater length of chain than at its minimum diameter. This extra length of chain is provided in connection with chain 36 by inward movement of take-up sprocket 40 which tends to rotate small sprocket 18 clockwise. At the same time the extra length of chain 36' is provided by inward movement of take-up sprocket 40' which tends to rotate small sprocket 18' counter clockwise. Sprockets 18 and 18' being geared together differentially the pairs of small sprockets 18, 18' may be moved inwardly and outwardly at will and the two chains 36, 36' operate to transmit the torque from sprocket 10 to sprockets 34, 34' on shaft 32 giving a positive, infinitely variable speed drive.

It will be noted that the take-up sprockets 40, 40' may both move in the same direction and, as the take-up required in each chain will be the same, sprockets 40 and 40' may then be mounted on a common movable support.

Figure 10:
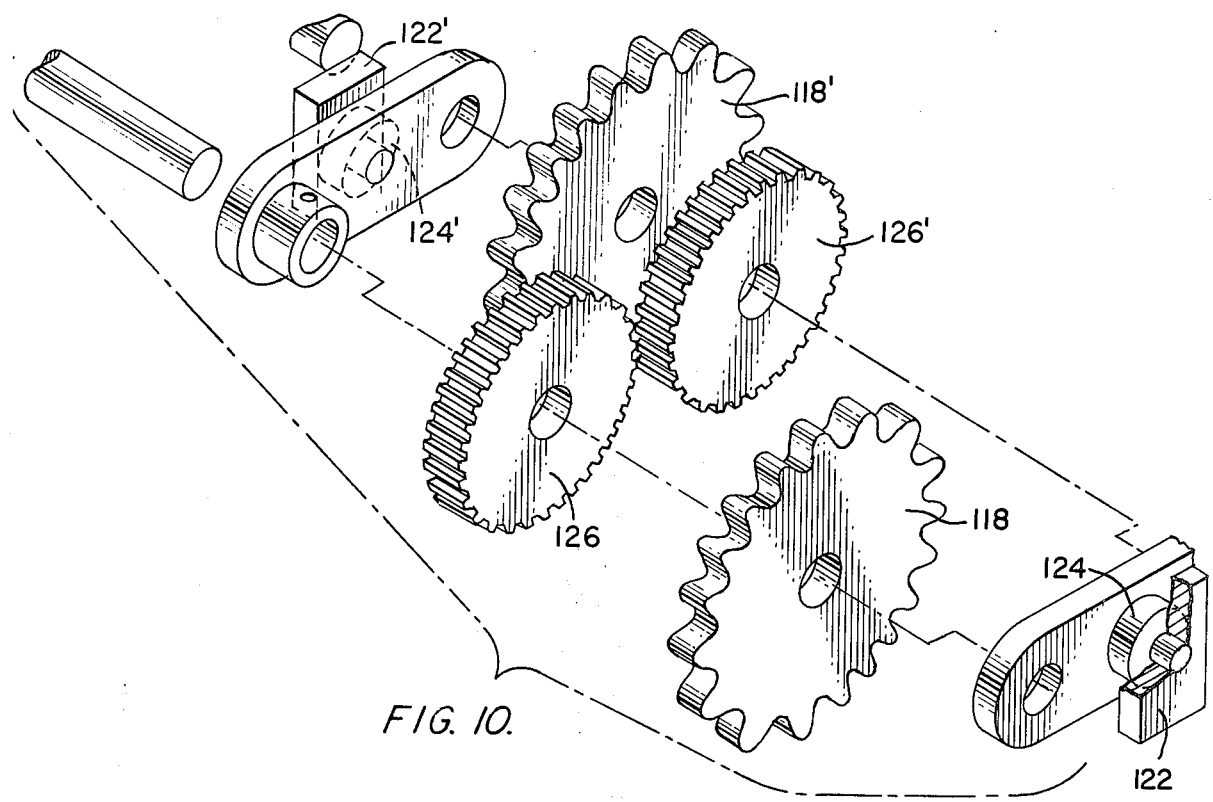
FIG. 10 is an exploded view of a pair of sprockets on the adjustable radius sprocket as seen in FIG. 9.
Figure 11:
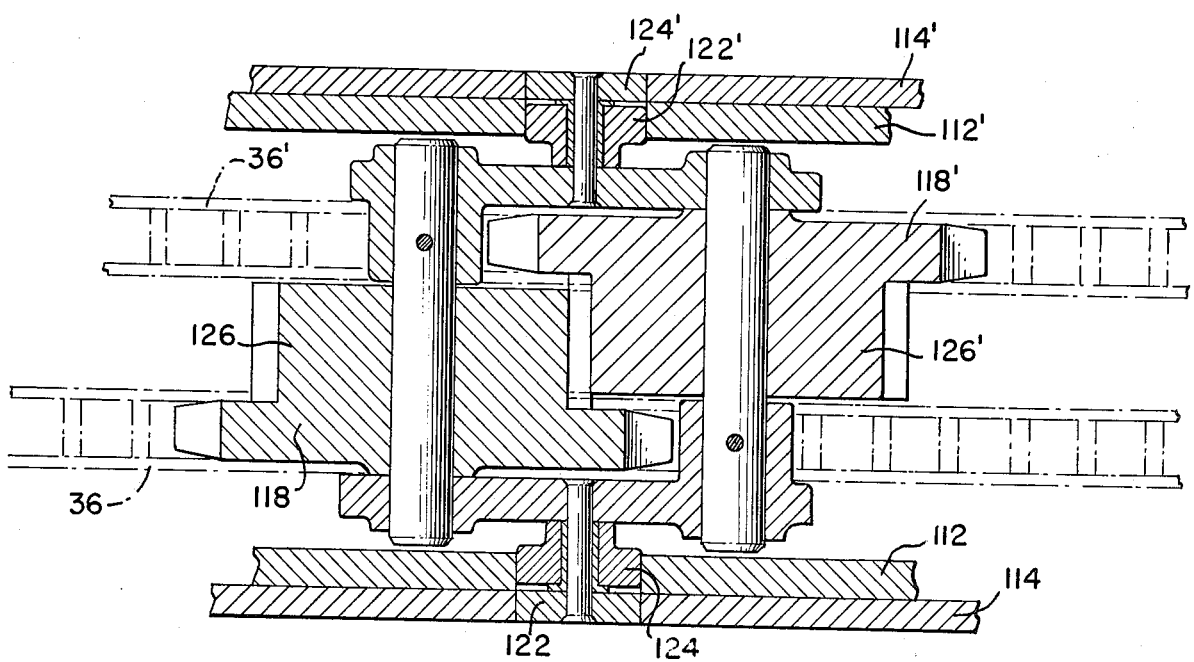
FIG. 11 is a sectional view of a pair of sprockets on line 11, 11 of FIG. 9.
Figure 12:
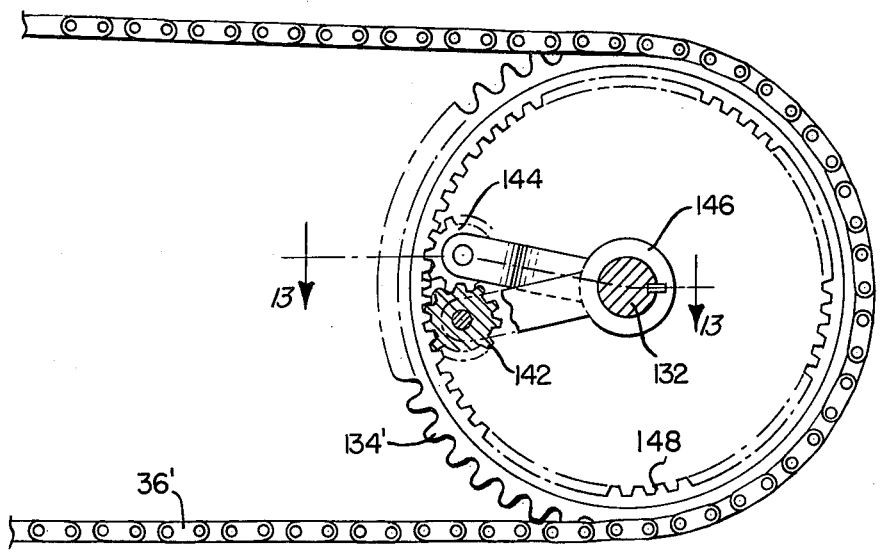
FIG. 12 is a section taken on line 12-12 of FIG. 6.
Figure 13:
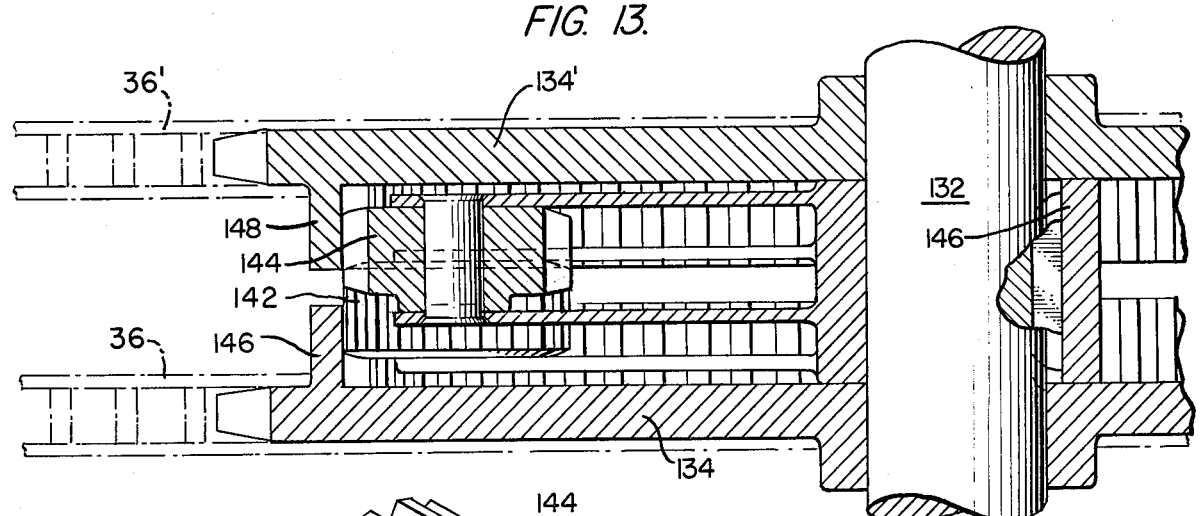
FIG. 13 is a section taken on line 13, 13 of FIG. 12.
Figure 14:
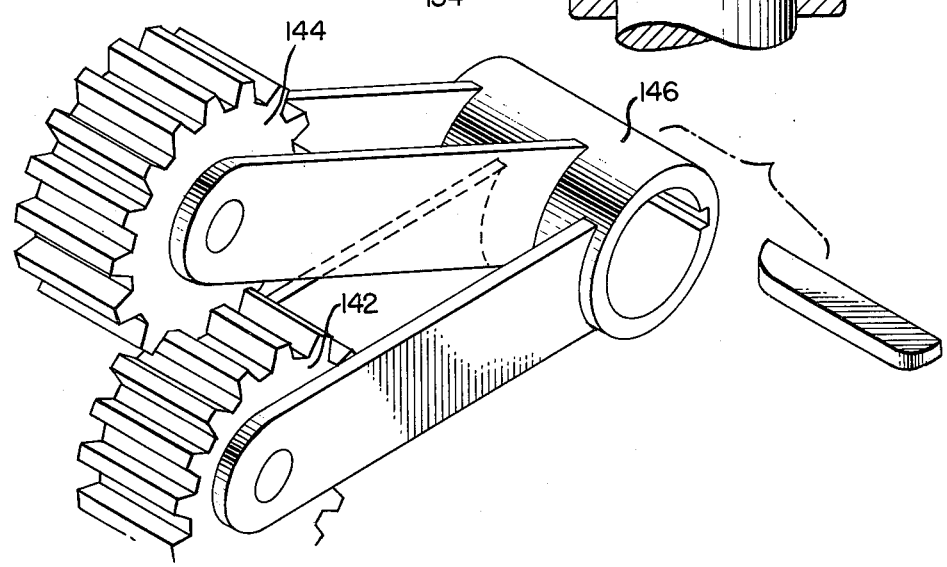
FIG. 14 is a perspective view showing the differential gears keyed to the drive shaft seen in FIG. 13.

It has been found that the device of FIGS. 1–5 which illustrates the basic principle of the constantly variable speed chain drive may be improved as shown in FIGS. 6 to 14, in which the type of differential gearing used permits the device to be made less expensively and to be less bulky. Also in the FIGS. 6 to 14 modification, the driven sprockets 134 and 134' are connected to the drive shaft 132 by a differential gearing as illustrated in FIGS. 12, 13 and 14.

Figure 6:
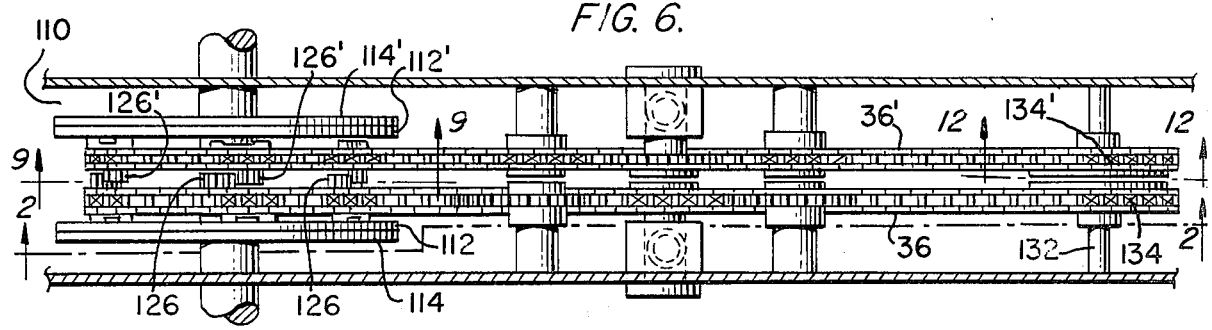
FIG. 6 is a plan view similar to FIG. 3 of a further modification of the device.
Figure 9:
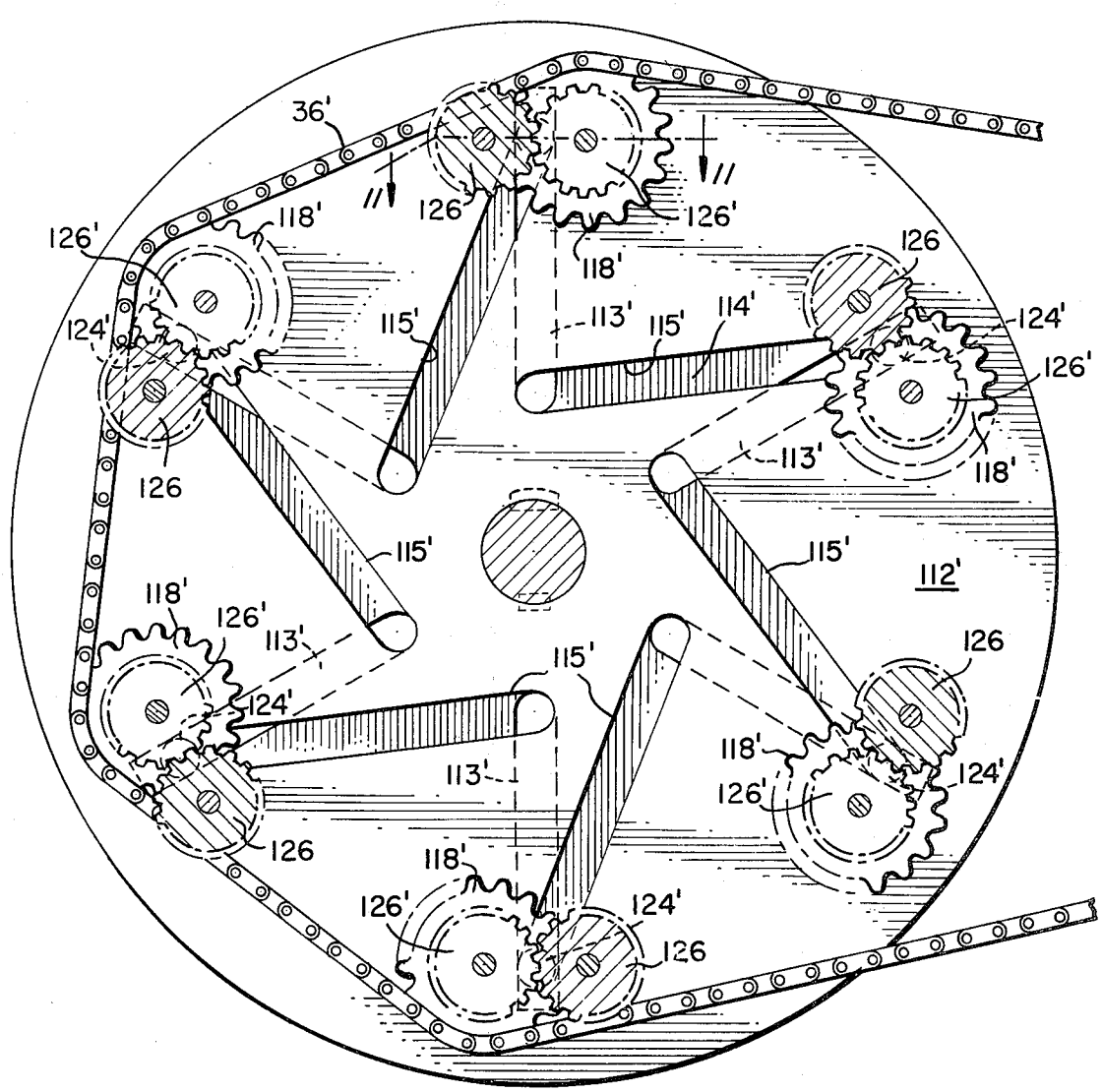
FIG. 9 is an enlarged section taken on line 9,9 of FIG. 6.
Figure 7:
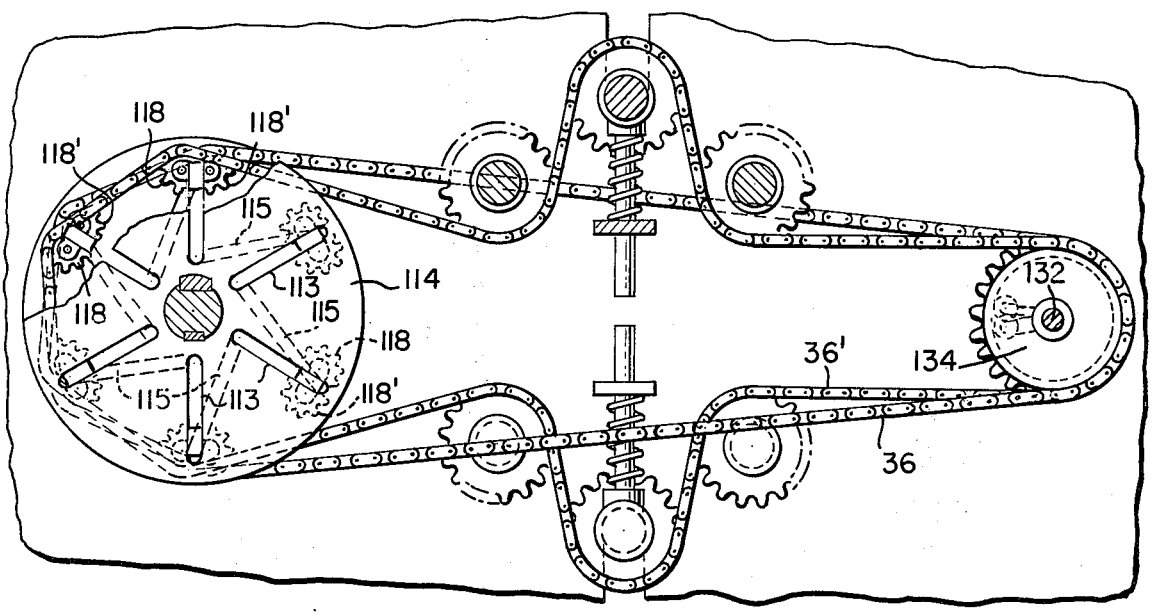
FIG. 7 is a view similar to FIG. 1 showing the modification seen in FIG. 6 operating at the highest speed ratio.
Figure 8:
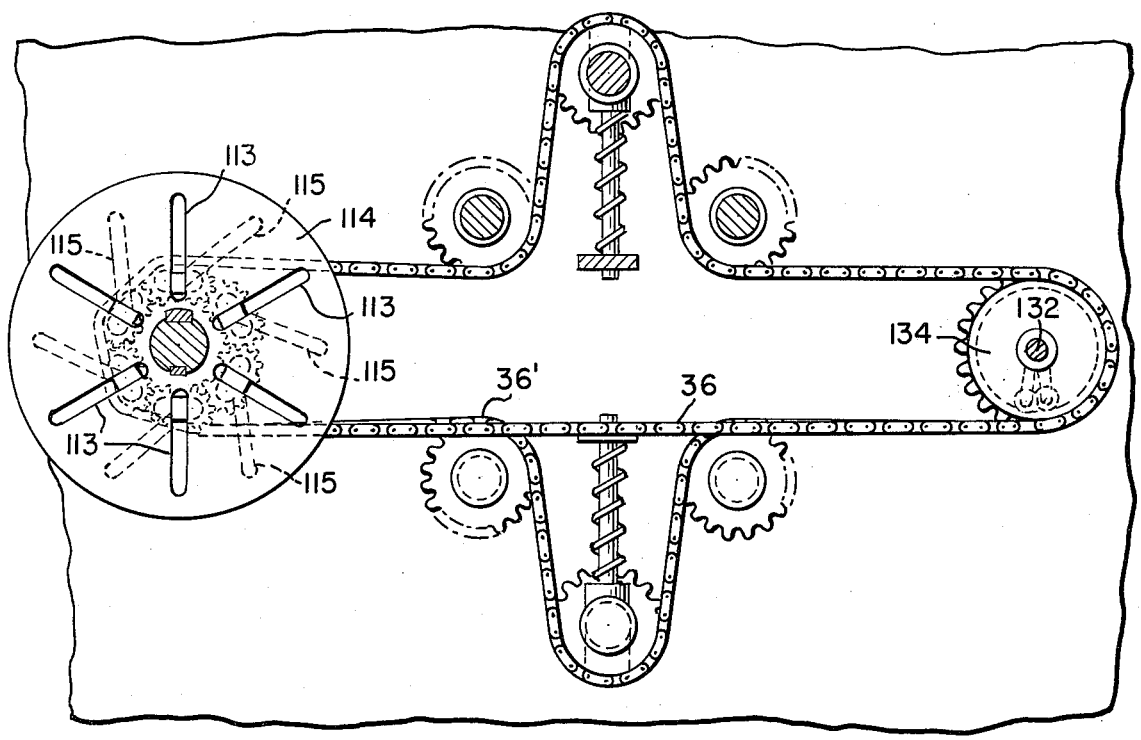
FIG. 8 is a view similar to FIG. 2 showing the modification of FIG. 6 operating at the lowest speed ratio.

As shown in FIGS. 7 and 8 the modification of the device of FIG. 6 is seen to be basically the same as the modification of FIGS. 1–5.

The differences in the modification of FIGS. 6 to 14 inclusive lie in the use of offset sprockets 118, 118' on the variable radius sprockets; and the use of a differential gearing between the driven sprockets 134, 134' and the driven shaft 132 which corresponds to the driven shaft 32 of FIGS. 1–5.

The plurality of pairs of sprockets 118, 118' seen in FIGS. 6, 7, 8 and 9 are clearly illustrated in FIGS. 10 and 11. Small sprocket 118 is mounted on or is integral with a pinion 126. Similarly small sprocket 118' is mounted on or integral with a small sprocket 126'. Small sprockets 126 and 126' are in mesh with each other, so no equivalent of bevel gear 28 is required. We notice too that the sprockets 118 and 118' lie on different radii which gives an improved distribution of forces.

The relative rotation between discs 112, 112' and 114 and 114' may be accomplished by any known means as explained above in connection with discs 12, 12' and 14, 14' in describing FIGS. 1 to 5.

The chain slack take-up means seen in FIGS. 6, 7 and 8 is exactly the same as that seen in FIGS. 1, 2 and 3, and need not be again described.

The driven sprockets 134 and 134' mounted on driven shaft 132 differ from sprockets 34 and 34' in that they are mounted for rotation on shaft 132, and are connected to each other and to shaft 132 by differential gears 142 and 144.

Sprocket 134 is mounted on the ring gear 146, and sprocket 134' is mounted on the ring gear 148. Between these ring gears, which face each other, a spider element 146 is keyed to shaft 132. As seen most clearly in FIGS. 12 and 14 pinions 142 and 144 are carried by spider element 146. Pinion 142 is in mesh with internal ring gear 146; and Pinion 144 is in mesh with ring gear 148 while pinions 142 and 144 are in mesh with each other.

It is seen, then that upon rotation of variable radius sprockets 110, corresponding to sprocket 10 in FIG. 3, chains 36 and 36' will both be pulled in the same direction which will tend to rotate sprockets 134 and 134' in the same direction. There will be a slight tendency to vibration at higher speed ratios due to the spacing of the small sprockets on the variable radius sprocket 10 in the modification of FIGS. 1–5.

This tendency to vibration is reduced in the modification of FIGS. 6–14 between the sprocket 110 and shaft 132: first by the fact that small sprockets 118 and 118' are spaced circumferentially from each other; and second by the differential drive between sprockets 134 and 134' whereby the slight variations in chain speed due to the spacing of small sprockets 118 and 118' around the drive sprocket 10 are conveyed differentially to the driven shaft 132.

Ropes, or belts over pulleys could, of course, be used in lieu of chains and sprockets. Other types of devices to simultaneously move the pairs of small sprockets outwardly and inwardly, and other types of differential means may be employed between the pairs of small sprockets without departing from the scope of this invention.

I claim:

1. A variable speed sprocket and chain drive comprising a first and a second shaft parallel to each other, two sprockets of the same diameter drivingly mounted on said first shaft, at least one disc provided with a plurality of equally circumferentially spaced generally radial slots mounted on said second shaft; a carrier nonrotatably mounted in each said generally radial slot in said disc, means operatively mounted on said second shaft to simultaneously and selectively move said carriers in said generally radial slots, a pair of small sprockets mounted on each of said carriers, one of said small sprockets of said pairs of small sprockets being aligned with each of said two sprockets mounted on said first shaft, differential means operatively connecting the two sprockets of each said pair of small sprockets, two endless chains one trained over each of said sprockets mounted on said first shaft and over aligned small sprockets of said pairs of sprockets, and take-up means for each said endless chain positioned in opposite flights of chain between said first and second shafts.

2. The variable speed sprocket and chain drive of claim 1 in which said small sprockets of each said pair of small sprockets are mounted on parallel shafts and the differential means operatively connecting the said small sprockets of each said pair of small sprockets consists of pinions mounted on each said small sprocket.

3. The variable speed sprocket and chain drive of claim 2 in which said two sprockets drivingly mounted on said first shaft are each provided with an internal ring gear, and said first shaft carries a spider means carrying differential pinions meshed with said internal ring gears to constitute said driving engagement between said two sprockets and said first shaft.

4. The variable speed sprocket and chain drive of claim 1 in which the means by which said two sprockets of the same diameter is drivingly mounted on said first shaft includes differential gearing.

5. A variable diameter sprocket for use in chain drive devices comprising a plurality of pairs of small sprockets each pair being mounted for simultaneous outward or inward radial movement with respect to the variable diameter sprocket, the sprockets of each said pair of sprockets being laterally offset from each other to be in parallel planes, and being operatively connected to provide opposite hand rotation of said small sprockets of each said pair.

6. A variable speed sprocket and chain drive comprising a first and a second shaft parallel to each other, two sprockets of the same diameter keyed to said first shaft, at least one disc provided with a plurality of equally circumferentially spaced generally radial slots, a carrier shaft radially slidably and nonrotatably mounted in each said generally radial slot in said disc, said carrier shafts extending parallel to said second shaft, means to move all of said carrier shafts in said generally radial slots simultaneously radially of said second shaft, a pair of small sprockets mounted on each of said carrier shafts, each said small sprocket of said pairs of small sprockets being aligned with one of said two sprockets on said first shaft, differential means operatively connecting the two sprockets of each said pair of small sprockets, two endless chains each trained over one of said sprockets on said first shaft and over aligned small sprockets of said pairs of sprockets, and take-up means for each said endless chain positioned in opposite flights of chain between said first and second shafts.

* * * * *